(12) United States Patent
Mori

(10) Patent No.: US 9,699,339 B2
(45) Date of Patent: Jul. 4, 2017

(54) IMAGE READING APPARATUS, COMPUTER READABLE MEDIUM FOR THE IMAGE READING APPARATUS, AND METHOD TO CORRECT AN IMAGE READ BY THE IMAGE READING APPARATUS

(71) Applicant: BROTHER KOGYO KABUSHIKI KAISHA, Nagoya-shi, Aichi-ken (JP)

(72) Inventor: Hiroko Mori, Handa (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/918,797

(22) Filed: Oct. 21, 2015

(65) Prior Publication Data
US 2016/0119494 A1 Apr. 28, 2016

(30) Foreign Application Priority Data

Oct. 23, 2014 (JP) ................. 2014-215981

(51) Int. Cl.
H04N 1/00 (2006.01)
H04N 1/12 (2006.01)
H04N 1/38 (2006.01)
H04N 1/387 (2006.01)

(52) U.S. Cl.
CPC ..... *H04N 1/00745* (2013.01); *H04N 1/00588* (2013.01); *H04N 1/00705* (2013.01); *H04N 1/00734* (2013.01); *H04N 1/00774* (2013.01); *H04N 1/121* (2013.01); *H04N 1/125* (2013.01); *H04N 1/38* (2013.01); *H04N 1/3873* (2013.01); *B65H 2801/39* (2013.01); *H04N 2201/0094* (2013.01)

(58) Field of Classification Search
USPC ....................................... 358/1.12
See application file for complete search history.

(56) References Cited

U.S. PATENT DOCUMENTS

2008/0122166 A1* 5/2008 Fukube ............... B65H 7/14
271/265.01
2011/0075168 A1* 3/2011 Ikari ............... H04N 1/00687
358/1.9

FOREIGN PATENT DOCUMENTS

JP 2011-071763 A 4/2011
JP 2013-115617 A 6/2013

* cited by examiner

*Primary Examiner* — Ngon Nguyen
(74) *Attorney, Agent, or Firm* — Merchant & Gould P.C.

(57) ABSTRACT

An image forming apparatus, including a reading device and a controller to control the reading device to execute a reading operation, is provided. The controller in the reading operation executes a leading edge detecting process, wherein a leading edge of an original sheet is detected from image data acquired through the reading device; a trailing edge detecting process, wherein a trailing edge of the original sheet is detected from the image data acquired through the reading device; a determining process, wherein one of the leading edge and the trailing edge to be used to correct the image data acquired through the reading device is determined based on conditions of the detected leading edge and the trailing edge; and a correcting process, wherein the image data is corrected by use of the determined one of the leading edge and the trailing edge determined in the determining process.

19 Claims, 10 Drawing Sheets

IMAGE READING APPARATUS, COMPUTER READABLE MEDIUM FOR THE IMAGE READING APPARATUS, AND METHOD TO CORRECT AN IMAGE READ BY THE IMAGE READING APPARATUS

CROSS REFERENCE TO RELATED APPLICATION

This application claims priority from Japanese Patent Application No. 2014-215981 filed on Oct. 23, 2014, the entire subject matter of which is incorporated herein by reference.

BACKGROUND

Technical Field

An aspect of the present invention relates to an image reading apparatus capable of reading an image of an original sheet, a computer readable medium to store a computer readable program to control the image reading apparatus, and a method to correct image data achieved from the image of the original sheet read by the image reading apparatus.

Related Art

In a field of an image reading apparatus to read an image of an original sheet, a technique to detect edges of the original sheet and correct image data of the read image is known. The image data may be corrected with reference to the detected edges of the original sheet so that, for example, inclination of the read image may be corrected or an edge area in the image may be trimmed.

SUMMARY

Meanwhile, there may be a case that an edge on one side of the original sheet is damaged or folded (dog-eared), and the edge may not be accurately detected. In such a case, image data of the read image may not be accurately corrected or may not be corrected at all.

The present invention is advantageous in that a technique to correct image data, which is generated from an original image read by a scanner, while accuracy of correcting the image data is restrained from lowering, is provided.

According to an aspect of the present invention, an image forming apparatus, including a reading device configured to read an image including an image of an original sheet and generate image data based on the read image and a controller configured to execute an image reading operation is provided. The controller is configured to execute a leading edge detecting process, in which the controller detects a leading edge of the original sheet with regard to a direction to convey the original sheet from the image data acquired through the reading device; a trailing edge detecting process, in which the controller detects a trailing edge of the original sheet with regard to the direction to convey the original sheet from the image data acquired through the reading device; a determining process, in which the controller determines one of the leading edge and the trailing edge to be used to correct the image data acquired through the reading device based on a condition of the leading edge detected in the leading edge detecting process and a condition of the trailing edge detected in the trailing edge detecting process; and a correcting process, in which the controller corrects the image data acquired through the reading device by use of the one of the leading edge and the trailing edge determined in the determining process.

According to another aspect of the present invention, a non-transitory computer readable medium storing computer readable instructions that are executable by a computer to control an image reading apparatus, is provided. The computer readable instructions, when executed by the computer, cause the computer to control the image forming apparatus by executing an acquiring step to acquire image data including an image of an original sheet; a leading edge detecting step to detect a leading edge of the original sheet with regard to a direction to convey the original sheet from the image data acquired in the acquiring step; a trailing edge detecting step to detect a trailing edge of the original sheet from the image data acquired in the acquiring step; a determining step to determine one of the leading edge and the trailing edge to be used to correct the image data acquired in the acquiring step based on a condition of the leading edge detected in the detecting step and a condition of the trailing edge detected in the trailing edge detecting step; and a correcting step to correct the image data acquired in the acquiring step by use of the one of the leading edge and the trailing edge determined in the determining step.

According to still another aspect of the present invention, a method to be implemented on a computer to correct an image including an image of an original sheet read by an image reading apparatus, is provided. The method includes an acquiring step to acquire image data including the read image of the original sheet; a leading edge detecting step to detect a leading edge of the original sheet with regard to a direction to convey the original sheet from the image data acquired in the acquiring step; a trailing edge detecting step to detect a trailing edge of the original sheet from the image data acquired in the acquiring step; a determining step to determine one of the leading edge and the trailing edge to be used to correct the image data acquired in the acquiring step based on a condition of the leading edge detected in the detecting step and a condition of the trailing edge detected in the trailing edge detecting step; and a correcting step to correct the image data acquired in the acquiring step by use of the one of the leading edge and the trailing edge determined in the determining step.

BRIEF DESCRIPTION OF THE ACCOMPANYING DRAWINGS

DETAILED DESCRIPTION

Hereinafter, an exemplary configuration of a scanner 100 being an image reading apparatus according to an embodiment of the present invention will be described with reference to the accompanying drawings.

Figure 1:
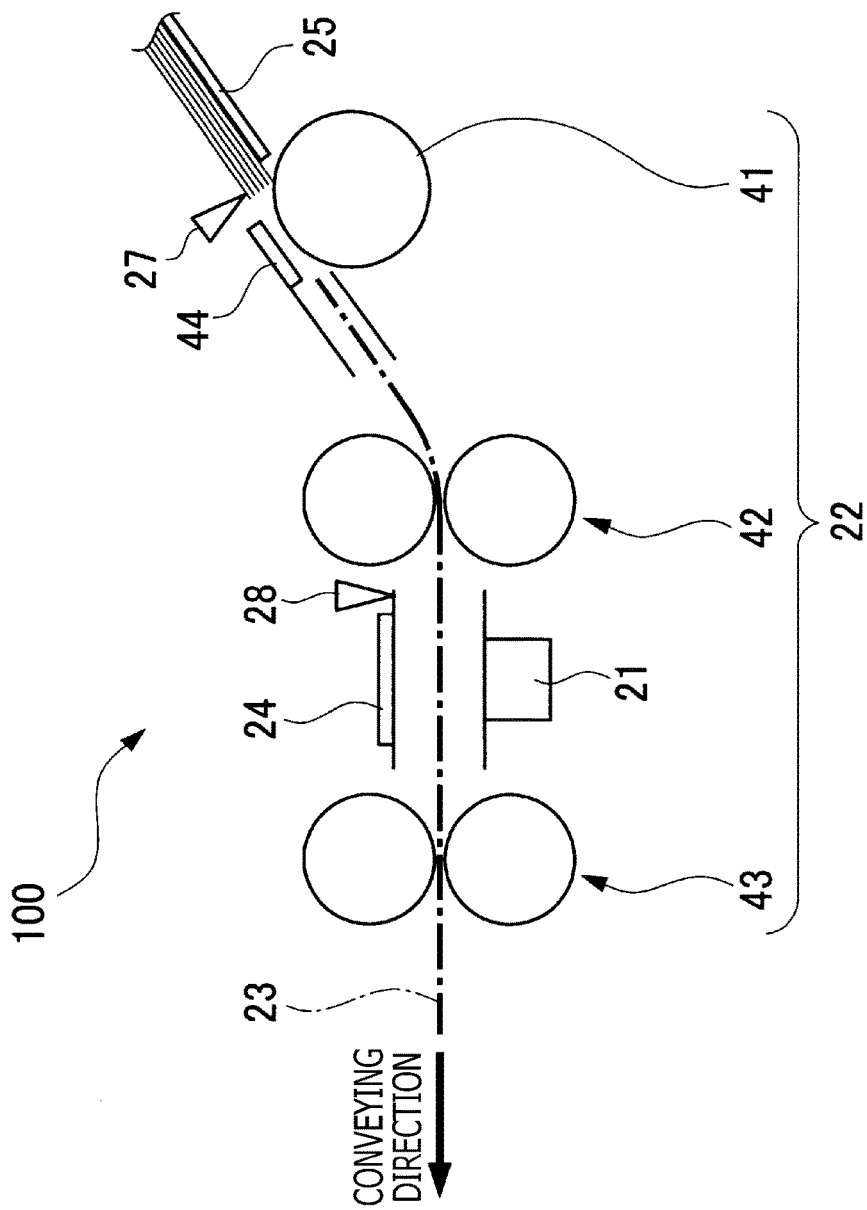
FIG. 1 illustrates an overview of a scanner according to an embodiment of the present disclosure.

The scanner 100 includes, as shown in FIG. 1, a reading head 21 and a conveyer device 22. An image appearing on an original sheet which is conveyed by the conveyer device 22 may be read by the reading head 21. The reading head 21 casts light upon a spot on the original sheet that is in a readable area to face with the reading head 21, receives the light reflected on the spot, and outputs a signal according to an amount of the received light. Meanwhile, the scanner 100 achieves image data generated based on the received signals. The scanner 100 in the present embodiment may be, for example, but not limited to, a contact image scanner (CIS) or a charge-coupled device (CCD).

The conveyer device 22 may convey the original sheet along a conveyer path 23, which is indicated by a dash-and-dot line, from an upstream on the right to a downstream on the left in FIG. 1. The scanner 100 further includes a sheet presser 24, which is disposed at a position to face with the reading head 21 across the conveyer path 23. When the reading head 21 is driven to read an image while no original sheet is in the readable area, the reading head 21 reads an image of the sheet presser 24, which has either a plain white or plain gray surface on a side to face with the reading head 21.

The scanner 100 further includes, as shown in FIG. 1, a sensor 27 and a sensor 28. The sensors 27, 28 each senses presence or absence of the original sheet at each corresponding position in the conveyer path 23 and outputs a signal according to the presence or absence of the original sheet. The conveyer device 22 includes a feeder roller 41, a conveyer roller pair 42, and a conveyer roller pair 43, in the order given, from the upstream toward the downstream, along a conveying direction being a direction to convey the original sheet (e.g., from right to left in FIG. 1). In particular, the conveyer roller pair 42 is disposed on an upstream side of the reading head 21 with regard to the conveying direction, and the conveyer roller pair 43 is disposed on a downstream side of the reading head 21 with regard to the conveying direction. The scanner 100 further includes a separator pad 44 along the conveyer path 23 at a position to face with the feeder roller 41.

The feeder roller 41 may convey original sheets stacked on a sheet tray 25, one at a time, to the conveyer path 23 in conjunction with the separator pad 44. The conveyer roller pairs 42, 43 each includes a driving roller and a driven roller arranged to face with the driving roller and conveys the original sheet along the conveyer path 23 so that the original sheet faces with the reading head 21 at a position between the conveyer roller pair 42 and the conveyer roller pair 43. The sensor 27 outputs the signal corresponding to the presence or absence of the original sheet placed on the sheet tray 25. The sensor 28 outputs the signal corresponding to the presence or absence of the original sheet at a position downstream of the conveyer roller pair 42 and upstream of the reading head 21 with regard to the conveying direction.

In the scanner 100 according to the present embodiment, a readable range along a widthwise direction, which is a direction orthogonal to the conveying direction and corresponds to a direction of depth in FIG. 1, may be determined by a configuration of the reading head 21. The readable range may be substantially equivalent to the aforementioned readable area that faces with the reading head 21. That is, the reading head 21 may read an image of a predetermined range along the widthwise direction regardless of a size of the original sheet. In the meantime, timings to start and stop reading an image by the reading head 21 are determined based on at least one of the output signals from the sensor 27 and the sensor 28. The sensor 27 and the sensor 28 each outputs the signal corresponding to the presence or absence of the original sheet in at least one detectable position along the widthwise direction. The detectable positions for the sensor 27 and the sensor 28 may at a widthwise central position or may be at different positions along the widthwise direction.

Figure 2:
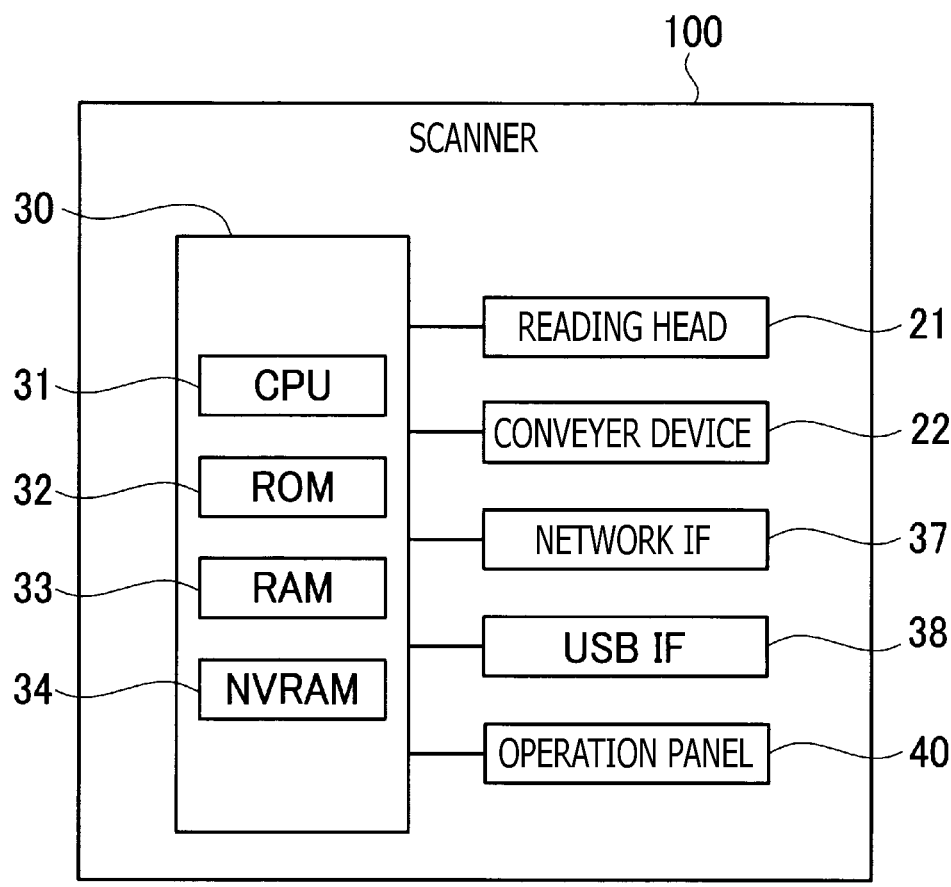
FIG. 2 shows a block diagram to illustrate an electrical configuration of the scanner according to the embodiment of the present disclosure.

Next, an electrical configuration of the scanner 100 will be described with reference to FIG. 2. As shown in FIG. 2, the scanner 100 includes a controller 30, which includes a central processing unit (CPU) 31, a read-only memory (RAM) 33, a non-volatile RAM (NVRAM) 34. Further, the scanner 100 includes the reading head 21, the conveyer device 22, a network interface (IF) 37, a universal serial bus IF (USB IF) 38, and an operation panel 40, which are electrically connected with the controller 30.

The ROM 32 stores various types of information to control the scanner 100 such as controlling programs, setting information, and initial configuration values. The RAM 33 may be used as a work area, in which the controlling programs are run, and as a memory area, in which data is temporarily stored. The CPU 31 processes the information, stores computation results in the RAM 33 and/or the NVRAM 34, and controls behaviors of parts and components in the scanner 100 according to the controlling programs read from the ROM 32.

The controller 30 shown in FIG. 2 may represent one or more hardware devices that are usable to control the behavior of the scanner 100. In other words, the controller 30 may or may not be a single hardware device to control the scanner 100. Further, the controller 30 may include an application specific integrated circuit (ASIC), or an ASIC may serve as the controller to control the scanner 100.

The network IF 37 serves to connect the scanner 100 with an external device (not shown) through a network, which may include, for example, a LAN cable, so that the scanner 100 may communicate with the external device. The USB IF 38 serves to connect the scanner 100 with an external device (not shown) through, for example, a USB cable (not shown) so that the scanner 100 may communicate with the external device. The operation panel 40 may include a display (not shown) and input buttons (not shown), through which information may be displayed to a user and the user's instruction may be entered.

Next, a reading operation to be performed by the scanner 100 to read an image of an original sheet will be described below. According to the present embodiment, the scanner 100 may convey the original sheet and read the image of the original sheet to acquire image data, which represents the read image, and may generate output data based on the acquired image data. Further, the scanner 100 may output the generated output data to a designated destination. A format of the output data may be, but not limited to, PDF, JPEG, GIF, or bitmap.

When one or more original sheets are placed on the sheet tray 25, and when the scanner 100 receives an instruction from the user to read the original sheets through, for example, the operation panel 40, the scanner 100 manipulates the conveyer device 22 to convey one of the original sheets. Thereafter, based on, for example, the signal from the sensor 28, the scanner 100 starts reading the image of the readable area by manipulating the reading head 21 before the original sheet reaches the position facing the reading head 21, i.e., the readable area.

Figure 3:
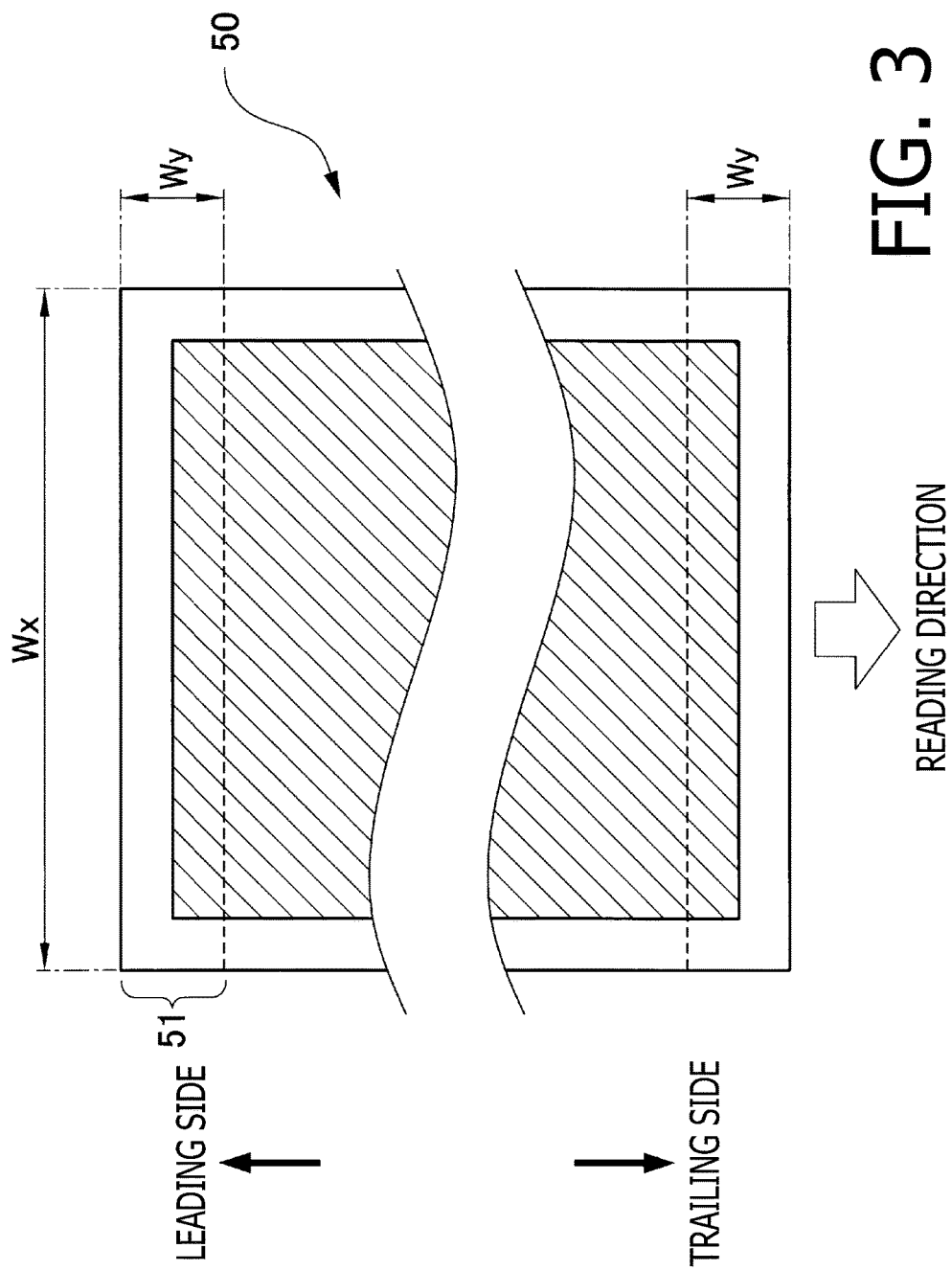
FIG. 3 illustrates image data of an image including an image of an original sheet read by the scanner according to the embodiment of the present disclosure.

Thereby, the scanner 100 acquires image data 50, which may be for example illustrated in a form shown in FIG. 3. The image data 50 represents a read image including an image of the original sheet conveyed through the readable area, which has a readable width Wx along the widthwise direction. The readable width Wx is a preset width determined by the configuration of the reading head 21. In the following description, a side of a leading end of the original sheet which is read earliest within the original sheet along the conveying direction will be referred to as a leading side, and a side of a trailing end of the original sheet which is read latest within the original sheet along the conveying direction will be referred to as a trailing side. In another embodiment, the leading side may be an upstream side and the trailing side may be a downstream side with regard to the conveying direction. In FIGS. 3-9 and 12-16, a hatched area represents the image of the original sheet occupying the readable area. In this regard, the image data 50 includes an image of a blank area on rims on edges of the original sheet, which is therefore an image of the sheet presser 24, at least in positions adjacent to the leading end and the trailing end of the original sheet.

After acquiring at least a part of the image data 50, which represents the image having the preset width Wx along the widthwise direction and a length greater than or equal to a predetermined length Wy along the conveying direction, the scanner 100 starts detecting an edge on the leading side of the original sheet. In particular, the scanner 100 may detect the edge of the original sheet on the leading side from at least a part of the image data 50, which represents the image having the readable width Wx along the widthwise direction and the predetermined length Wy from an upstream end of the blank area on the leading side along the conveying direction. The scanner 100 may detect the edge on the leading side of the original sheet while the scanner 100 reads a remainder of the original sheet simultaneously. A process to detect the edge on the leading side will be described later in detail.

The scanner 100 continues to read the image, and after the trailing end of the original sheet is conveyed through the position to face with the reading head 21, the scanner 100 manipulates the reading head 21 to stop reading. Thereafter, the scanner 100 detects an edge of the original sheet on the trailing side. The scanner 100 may detect the edge on the trailing side from a part of the image data 50, which represents an image having the preset readable width Wx along the widthwise direction and the predetermined length Wy from a downstream end of the blank area on the trailing side along the conveying direction. A process to detect the edge on the trailing side of the original sheet is similar to the process to detect the edge on the leading side of the original sheet, except that the process is applied to a portion on the trailing side rather than the leading side in the image data 50.

The scanner 100 thereafter processes the acquired image data 50, which represents the entire image read by the reading head 21, including the images of the blank areas and the image of the original sheet, with reference to at least one of a leading edge on the leading side and a trailing edge on the trailing side having been detected. In particular, the scanner 100 may perform at least one of a trimming process, through which a range containing an image of the original sheet is extracted from the image data 50, an inclination-correcting process, through which inclination of image of the original sheet within the entire image in the image data 50 is corrected, and a repairing process, through which the range containing the image of the original sheet is reshaped into, for example, a rectangle, when the range is not in a rectangular shape, for correction. Thereafter, the scanner 100 generates output data, which represents an outcome of the processes, based on the processed image data, and outputs the generated output data to a destination designated by the instruction from the user to read the original sheet.

Figure 4:
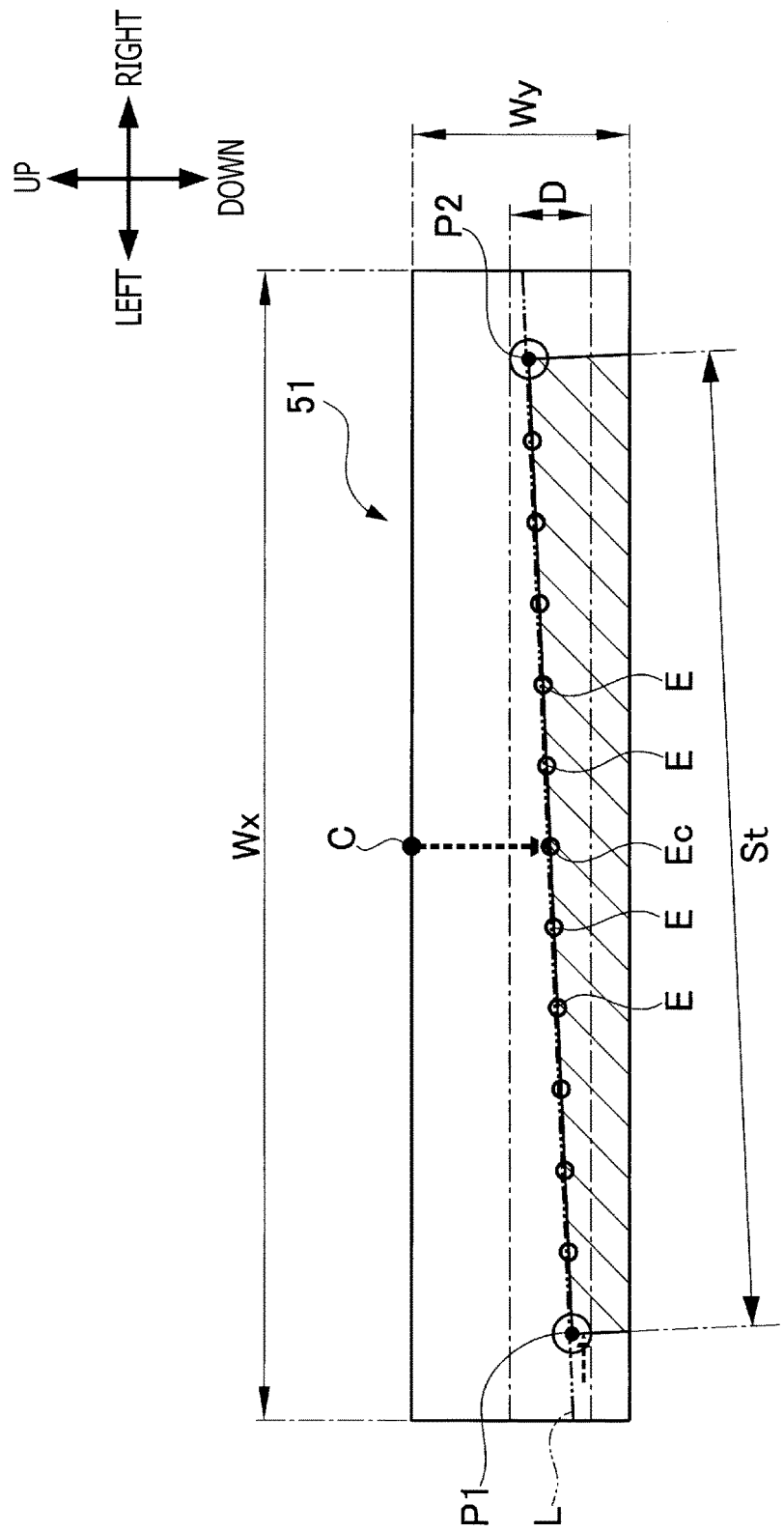
FIG. 4 is an illustrative view of a leading-side image in the image data read by the scanner according to the embodiment of the present disclosure.

Next, an edge detecting process to detect the edge on the leading side of the original sheet will be described in detail. The edge on the leading side of the original sheet may be detected based on the edge detecting process by use of leading-side image 51, which is a part of the image data 50 containing image data of a leading-end portion of the original sheet (see FIG. 3). In other words, the leading-side image 51 is a part of the image data 50, which represents an image in a range to be used to detect the edge of the original sheet on the leading side. The leading-side image 51 includes, as shown in FIG. 4, an image having the preset width Wx with regard to the widthwise direction and the predetermined length Wy with regard to the conveying direction. In the following description, orientation of the original sheet in the image data 50 will be referred to according to arrows, which indicate up, down, right, and left, shown in FIG. 4.

A flow of the edge detecting process in the scanner 100 may include the following five (5) steps. For Step 1, a widthwise central point Ec on the edge of the original sheet is obtained; for Step 2, a plurality of edge points E on the edge of the original sheet are obtained; for Step 3, linearity of the obtained edge points E is determined; for Step 4, an approximated line L for the plurality of edge points E is obtained; and for Step 5, a leftward end P1 and a rightward end P2 of the original sheet are obtained. Through Steps 1-5, a line between the leftward end P1 and the rightward end P2 obtained in Step 5 is recognized as the leading edge of the original sheet. If any of the obtainment in Step 1, 2, 4, or 5 fails, or if it is determined in Step 3 that the edge points do not possess linearity, the scanner 100 determines that it failed to detect the edge. Steps 1-5 will be described below.

In Step 1, as shown in FIG. 4, the scanner 100 scans the leading-side image 51 from a center C, which is at a widthwise central point on an upper end of the leading-side image 51, downward along the conveying direction to search for an area that satisfies an edge-forming condition, where either a brightness value or a red-green-blue (RGB) value in the image data is greater than or equal to a predetermined threshold value. When the area that satisfies the edge-forming condition is detected in the leading-side image 51, the scanner 100 obtains a position of a central edge point Ec, which is a topmost point within the area. The central edge point Ec will be used as a reference position to detect a leading edge of the original sheet.

For example, the scanner 100 may scan a leading-side image 51 (see FIG. 5) of an original sheet, of which widthwise central portion on the leading end is missing. In this case, even after searching through the leading-side image 51 for an area that satisfies the edge-forming condition, the scanner 100 may find no central edge point Ec. That is, after scanning the leading-side image 51, from the upper end downward to a lower end along the center C through the predetermined length Wy, the search may come to the end of the predetermined length Wy without finding any area that satisfies the edge-forming condition. If, for example, the scanner 100 is configured to start reading an image by the reading head 21 at a timing which depends on the output signal from the sensor 28, and, if the sensor 28 is arranged to scan a widthwise lopsided position of the original sheet displaced from the widthwise central position to determine presence of the original sheet, the scanner 100 may obtain image data, in which no central edge point Ec is found. If the scanner 100 fails to obtain the central edge point Ec, no leading edge of the original sheet may be detected in the leading-side image 51. On the other hand, if the scanner 100 successfully obtains the central edge point Ec, the scanner 100 follows the flow to Step 2.

In Step 2, the scanner 100 detects a plurality of edge points E (see FIG. 4), which are topmost points in the area that satisfies the edge-forming condition at an evenly spaced-apart positions along the widthwise direction with respect to the central edge point Ec obtained in Step 1. For example, the leading-side image 51 may include a search range D, which has a predetermined vertical length containing the central edge point Ec at a vertically intermediate position, and the scanner 100 may scan the search range D to obtain the edge points E. A length of the search range D along the conveying (vertical) direction is smaller than or equal to the predetermined length Wy of the leading-side image 51. Thus, by limiting the range to search for the edge points E to the search range D, a time period required to obtain the edge points E may be shortened. The scanner 100 may not necessarily detect the edge points E with reference to the central edge point Ec but may detect a plurality of topmost points in the area that satisfies the edge-forming condition at positions spaced apart for a smaller interval than the above-mentioned interval of the edge points E and obtain the edge points E based on, for example, an average position among the detected plurality of topmost points.

For example, the scanner 100 may scan a leading-side image 51 (see FIG. 6) of an original sheet, of which widthwise central portion on the leading side is missing. In this case, no edge point E may be detected with reference to the central edge point Ec. If, for example, the scanner 100 is configured to start reading an image by the reading head 21 at the timing dependent on the output signal from the sensor 28, and, if, unlike the example of FIG. 5, the sensor 28 is arranged to scan a widthwise central position of the original sheet to determine presence of the original sheet, the scanner 100 may obtain image data, in which no edge point other than the central edge point Ec is found. If the scanner 100 fails to obtain the edge points E, no leading edge of the original sheet may be detected in the leading-side image 51. On the other hand, if the scanner 100 successfully obtains the edge points E, the scanner 100 follows the flow to Step 3.

In Step 3, the scanner 100 examines linearity among the central edge point Ec and the edge points E (see FIG. 4). For example, the scanner 100 may collect values, each of which indicates inclination between adjoining edge points E. If variance among the collected inclination values is within a predetermined range, the scanner 100 may determine linearity of the central edge point Ec and the plurality of edge points E that the central edge point Ec and the plurality of edge points E align in line. If the variance is not within the predetermined range, the scanner 100 may determine that the central edge point Ec and the plurality of edge points E do not align in line or do not possess linearity. For example, the scanner 100 may obtain an inclination value by dividing a vertical distance between the adjoining edge points E by a widthwise distance between the adjoining edge points E and may calculate the variance by a least square method. For another example, the scanner 100 may examine whether a difference between a largest value and a smallest value in the inclination values should fall within a predetermined range to determine linearity among the central edge point Ec and the plurality of edge points E.

For example, the scanner 100 may scan a leading-side image 51 (see FIG. 7) of an original sheet, of which corner is missing due to, for example, dog-ear fold. In this case, the scanner 100 may determine that the edge points E do not possess linearity. In this example, the edge points E, which range between the leftmost edge point E and an edge point E1 at a peak of the corner of missing ear dog, may be on a line with a constant inclination. Meanwhile, an inclination between edge points E2 and E3 which are on an edge of the missing corner differs largely from the inclination in the line between the leftmost edge point E and the edge point E1 at the peak. Therefore, the scanner 100 may determine that the edge points E shown in FIG. 7 do not possess linearity. If the edge points E do not possess linearity, the scanner 100 may fail to detect the leading edge. On the other hand, if the scanner 100 determines that the edge points E possess linearity, the scanner 100 follows the flow to Step 4.

In Step 4, the scanner 100 obtains an approximate line L (see FIG. 4) based on coordinates of the central edge point Ec and the plurality of edge points E according to, for example, a least square method. While linearity of the edge points E has been determined in Step 3, the scanner 100 may obtain an equation of the approximate line L based on the arrangement of the edge points E. The scanner 100 follows the flow to Step 5.

In Step 5, the scanner 100 scans the leading-side image 51 to obtain widthwise ends of the image of the original sheet. The scanner 100 may start scanning the leading-side image 51 inward from a position, beyond which the edge points E obtained in Step 2 discontinue, toward the widthwise center of the leading-side image 51. For example, as indicated by a broken arrow placed in FIG. 4 in the vicinity of a leftward end P1 of the edge points E, the scanner 100 may scan an area in the vicinity of the edge point E on each widthwise end and search for the edge-forming condition to determine widthwise edges of the image of the original sheet. The scanner 100 may determine a leftward side and a rightward side of the image of the original sheet based on the obtained edges and may obtain a leftward end P1, which is an intersection between the leftward side and the approximate line L, and a rightward end P2, which is an intersection between the rightward side and the approximate line L. Further, the scanner 100 may determine a range between the leftward end P1 and the rightward end P2 on the approximate line L to be the leading edge of the original sheet. Therefore, a length St of the leading edge is a distance between the leftward end P1 and the rightward end P2 along the approximate line L.

Figure 8:
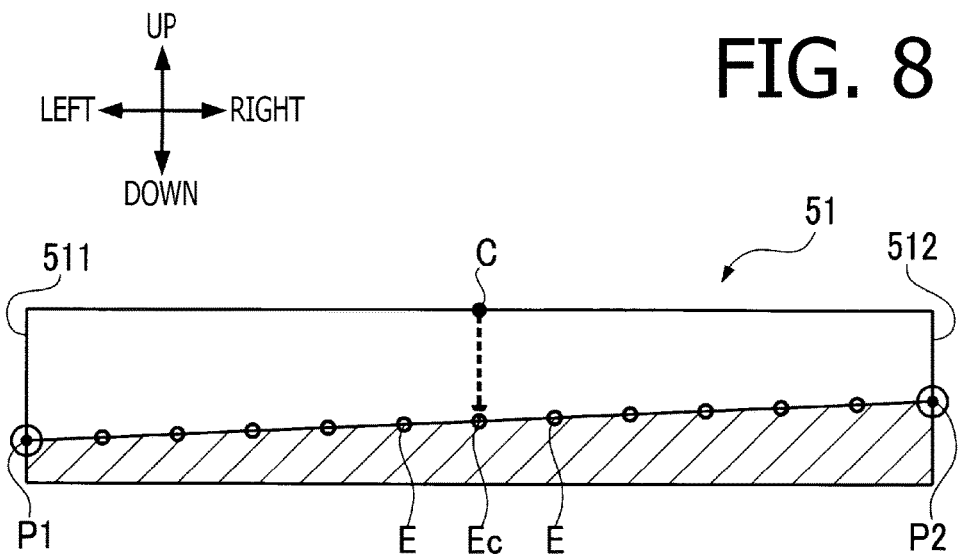
FIG. 8 is an illustrative view of the leading-side image including an image of the original sheet in the image data read by the scanner according to the embodiment of the present disclosure.

In this regard, for example, as shown in FIG. 8, one of the edge points E obtained in Step 2 that satisfy the edge-forming condition may fall on one of the widthwise ends and the vertical ends of the leading-side image 51. In such a case, in Step 5, with regard to a side on the widthwise end, on which the edge point E falls, the scanner 100 may not scan, but the widthwise side may be determined by an intersection between the approximate line L and the widthwise end of the leading-side image 51. More specifically, in the example of FIG. 8, the edge points E are obtained serially from a range between a leftward side 511 and a rightward side 512 while the scanner 100 determines an intersection between the approximate line L and the leftward side 511 to be the leftward end P1 and an intersection between the approximate line L and the rightward side 512 to be the rightward end P2.

Figure 9:
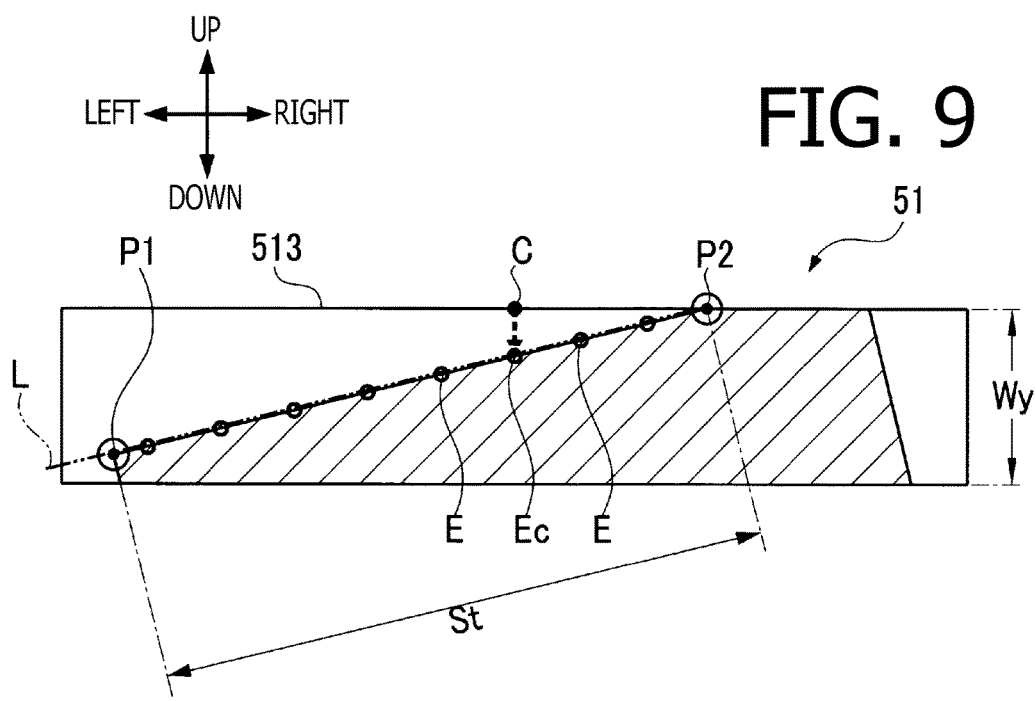
FIG. 9 is an illustrative view of the leading-side image including an image of the original sheet, of which corner exceeds beyond a readable area of the scanner according to the embodiment of the present disclosure.

For another example, as shown in FIG. 9, the original sheet may skew to incline largely, and a corner of the original sheet may exceed beyond the readable range. In this regard, the approximate line L may intersect with an upper side 513 of the leading-side image 51 in the image data 50. In this case, the scanner 100 may determine the intersection between the approximate line L and the upper side 513 to be a rightward end P2. In this regard, a leading edge of the original sheet is in a range between the leftward end P1 and the rightward end P2, and a distance between the leftward end P1 and the rightward end P2 is determined to be a length St of the leading edge.

Meanwhile, the scanner 100 continues to scan the image data 50 regardless of a detected condition of the leading edge. After completion of scanning the image data 50, the edge on the trailing side of the original sheet is detected based on the edge detecting process by use of a part of the image data 50 containing image data of a trailing-end portion of the original sheet (see FIG. 3). The trailing edge of the original sheet may be detected similarly to the leading edge of the original sheet. While Steps 1 through 5 are performed, however, a trailing side of the image data 50 may be handled similarly to the upper side of the image data 50 being processed in the leading-edge detecting process, and a side closer to the upper side of the image data 50 may be handled similarly to a lower side of the image data 50 being processed in the leading-edge detecting process.

Based on the detected conditions of the leading edge and the trailing edge of the original sheet, the scanner 100 determines one of the leading edge and the trailing edge to be an edge which is to be used to correct the image. For example, if the scanner 100 fails to detect one of the leading edge and the trailing edge, while the scanner 100 successfully detects the other of the leading edge and the trailing edge, the scanner determines the successfully detected one of the edges to be the edge which is to be used to correct the image. A method to correct the image by use of the determined edge will be described later in detail.

Next, a flow of steps in a read-and-output process, in which the scanner 100 reads an image and outputs image data generated based on the read image, will be described with reference to FIG. 10. The process may be activated and executed by the CPU 31 in response to the scanner 100 receiving a read-start instruction from a user.

As the process starts, in S101, the scanner 100 manipulates the conveyer device 22 and the reading head 21 to convey the original sheet and read an image of an original sheet at the predetermined timing. In S102, the scanner 100 determines if a part of the image, which has at least the predetermined length Wy, has been read, and image data for the read part of the image has been obtained. If the image data for the read part of the image having the predetermined length Wy has not been completed (S102: NO), the scanner 100 continues reading the image.

If the image data for the read part of the image having the predetermined length Wy has been completed (S102: YES), in S103, the scanner 100 starts searching for the leading edge. In other words, the scanner 100 performs Steps 1 through 5 to the leading-side image 51, which is the part of the image having the predetermined length Wy from the upper edge of the image data 50.

In S104, the scanner 100 determines if the leading edge of the original sheet is detected successfully. If the detection of the leading edge failed (S104: NO), in S105, the scanner 100 stores information concerning an error that caused the edge-detection failure in the RAM 33 or the NVRAM 34. The scanner 100 may store information concerning the edge, i.e., the leading edge, that failed to be detected, and information that specifies a widthwise position, in which the detection failed.

In S105, for example, the scanner 100 may store information, which indicates the fact that the detection of the leading edge failed, and a step number, in which the detection failed. For another example, if the detection failed in Step 1, the scanner 100 may store information indicating a missing central portion on the leading edge; if the detection failed in Step 2, the scanner 100 may store information indicating a missing central portion or a protrusive central portion on the leading edge; and if the detection failed in Step 3, the scanner 100 may store information indicating lack of linearity in the edge points E. For another example, the scanner 100 may store positional information concerning an area, in which the detection failed, for example among a central area, a leftward area, and a rightward area, as the error information concerning the failure. For another example, the scanner 100 may specify a position of the missing part of the original sheet or a position of the edge point E which is largely deviated from the approximate line L and may store information concerning the positions as the error information concerning the failure.

After storing the information concerning the failure (S105), or after the successful detection of the leading edge (S104: YES), in S106, the scanner 100 determines whether reading of the original sheet is completed to a trailing edge (S106). If reading of the original sheet is not completed to the trailing edge (S106: NO), the scanner 100 continues reading the original sheet.

When the original sheet is read entirely to the trailing edge (S106: YES), in S107, the scanner 100 starts detecting the trailing edge of the original sheet. The steps to detect the leading edge of the original sheet may be similarly applied to the trailing-end side of the original sheet in order to detect the trailing edge. If reading of the original sheet to the trailing edge is completed before the leading edge is detected, detection of the leading edge and detection of the trailing edge may be performed in parallel with each other simultaneously.

In S108, the scanner 100 determines whether the trailing edge of the original sheet is successfully detected. If detection of the trailing edge failed (S108: NO), in S109, the scanner 100 determines whether the detection of both the leading edge and the trailing edge failed. If the detection of both the leading edge and the trailing edge failed (S109: YES), there will be no edge to be used to correct the image in the image data 50. Therefore, in S110, the scanner 100 does not correct the image but outputs the image data 50 without correction. In S110, further, the scanner 100 may delete the cause of the edge-detection failure, which was stored in S105.

If the detection of both the leading edge and the trailing edge did not fail, in other words, if the leading edge has been successfully detected (S109: NO), in S111, the scanner 100 stores information concerning the error that caused the edge-detection failure of the trailing edge in the RAM 33 or the NVRAM 34. In S111, the scanner 100 may store information concerning the edge, i.e., the trailing edge, that failed to be detected, and information that specified a widthwise position, in which the detection failed. Therefore, in S111, the scanner 100 may store information, which indicates the fact that the detection of the trailing edge failed, and information concerning the error that caused the failure. After storing the information concerning the failure cause (S111), or after the successful detection of the trailing edge (S108: YES), in S120, the scanner 100 performs an output data generating process.

Figure 11:
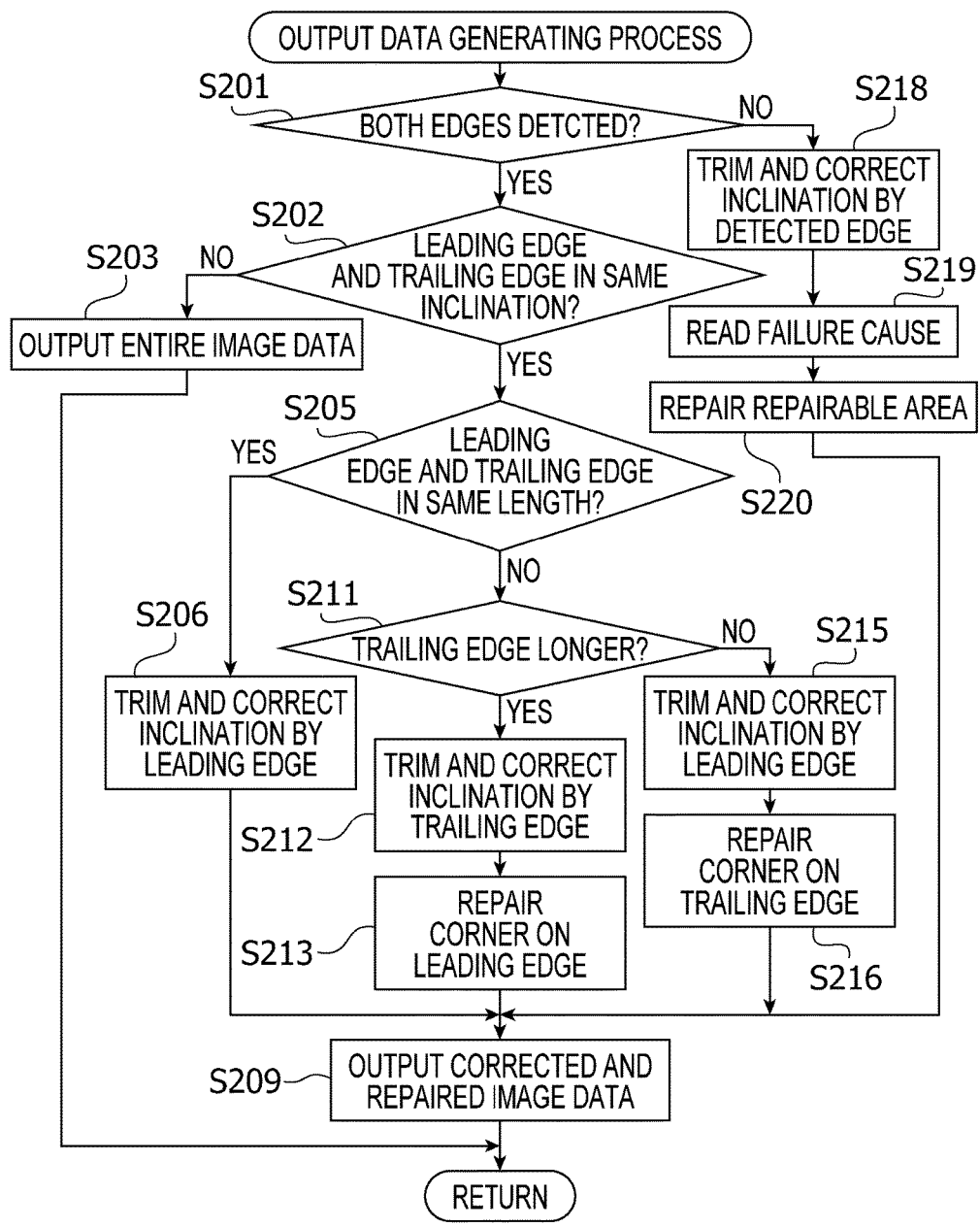
FIG. 11 is a flowchart to illustrate a flow of steps in an output date generating process to be performed in the scanner according to the embodiment of the present disclosure.

Next, the output data generating process, which is performed in S120 of the read-and-output process to generate the data to be output by the scanner 100, will be described with reference to FIG. 11. The output data generating process is performed after the successful detection of at least one of the leading edge and the trailing edge of the original sheet. In the output data generating process, the edge to be used to correct the image is determined between the leading edge and the trailing edge, the image is corrected by use of the determined one of the edges, and the corrected image data is output to a designated destination. Correction of the image may include, for example, trimming an edge area of the image, correcting inclination of an image of the original sheet, and repairing the image. The edge area may refer to an area, which includes one of the edges of the original sheet, in the image data 50.

As the output data generating process starts, in S201, the scanner 100 determines whether the detection of both the leading edge and the trailing edge has been successful. For example, if no cause concerning edge-detection failure of either the leading edge or the trailing edge is stored, the scanner 100 may determine that detection of both the leading edge and the trailing edge has been successful. If detection of both the leading edge and the trailing edge has been successful (S201: YES), in S202, the scanner 100 determines whether the leading edge and the trailing edge are substantially in a same inclination. The scanner 100 may determine that the leading edge and the trailing edge are substantially in a same inclination if, for example, a difference between the inclination of the leading edge and the inclination of the trailing edge is smaller than a predetermined threshold.

In S202, if the leading edge and the trailing edge are determined not to be in the same inclination (S202: NO), in S203, the scanner 100 does not correct the image but outputs the image data 50 without correction. When the inclination of the leading edge and the inclination of the trailing edge are substantially different, it may not be considered that the original sheet is in a rectangular shape. Therefore, the scanner 100 neither trim the original image into a rectangular shape nor adjust the inclination to correct the image data 50. Rather, the scanner 100 generates output data in a predetermined format from the image data 50 without correction and outputs the output data to a designated destination. Thereafter, the scanner 100 ends the output data generating process. The scanner 100 returns to the read-and-output process (FIG. 10) and ends the read-and-output process.

Meanwhile, in S202, if the leading edge and the trailing edge are determined to be in the same inclination (S202: YES), in S205, the scanner 100 determines whether a length of the leading edge and a length of the trailing edge are substantially the same. The scanner 100 may determine that the lengths of the leading edge and the trailing edge are substantially the same if, for example, a difference between the length of the leading edge and the length of the trailing edge is smaller than a predetermined threshold length. If the lengths of the leading edge and the trailing edge is determined to be substantially the same (S205: YES), the scanner 100 determines either one of the leading edge and the trailing edge to be edge used to correct the image data 50. For example, the leading edge may be determined to be the edge, which is to be used to correct the image data 50.

In S206, the scanner 100 trims the edge areas in the image data 50 into a rectangular shape with reference to the leading edge of the original sheet and corrects inclination of the original sheet with reference to the inclination of the leading edge. When trimming the edge areas, for example, the scanner 100 may estimate a length of the original sheet along the conveying direction with reference to a distance between the leading edge and the trailing edge. For another example, the scanner 100 may estimate the length of the original sheet along the conveying direction with reference to the output signal from the sensor 28. In S206, the trailing edge rather than the leading edge may be used to trim the edge areas and correct the inclination. For another example, the scanner 100 may determine a range bracketed by the leading edge and the trailing edge to be the range of the original sheet and extract the range to trim the edge areas.

In S209, the scanner 100 generates the output data in the predetermined format from the corrected image data and outputs the output data to the designated destination. Thereafter, the scanner 100 ends the output data generating process. The scanner 100 returns to the read-and-output process (FIG. 10) and ends the read-and-output process.

Figure 12:
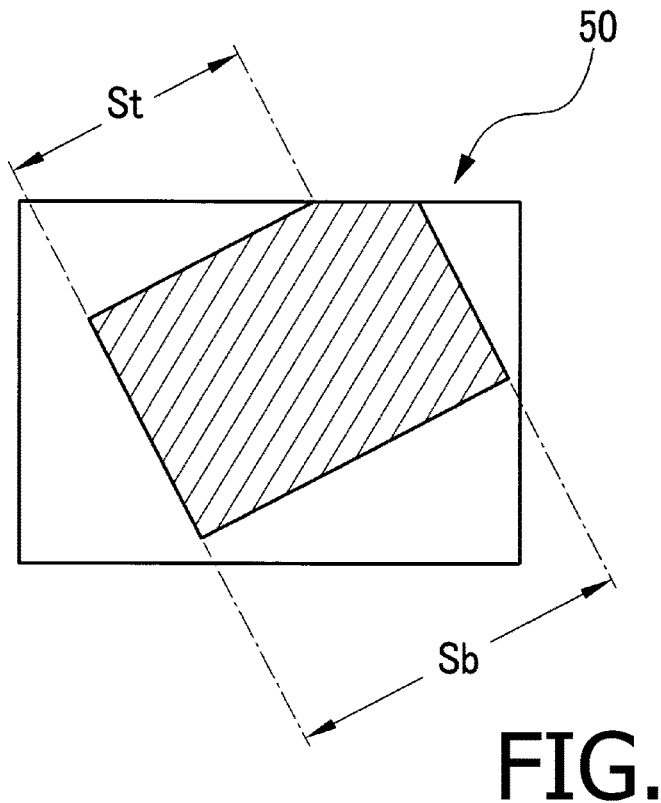
FIG. 12 illustrates image data to be corrected by the scanner according to the embodiment of the present disclosure.

Meanwhile, in S205, if the lengths of the leading edge and the trailing edge are determined not to be substantially the same (S205: NO), in S211, the scanner 100 examines whether the trailing edge is longer than the leading edge. For example, if the scanner 100 reads an image of the original sheet, one of the corners of which exceeds beyond the readable area, as shown in FIG. 9, the length St of the leading edge may be shorter than an original length of the leading edge of the original sheet. Meanwhile, as shown in FIG. 12, the trailing edge of the original sheet may fit inside the readable range, and a length Sb of the trailing edge may be determined to be substantially equal to an original length of the trailing edge of the original sheet. In this case, the scanner 100 may determine that the trailing edge is longer than the leading edge.

In S211, if the trailing edge is longer than the leading edge (S211: YES), the scanner 100 determines the trailing edge to be the edge, which is used to correct the image data 50.

When the lengths of the leading edge and the trailing edge are different, it may be considered that a part of the original sheet on the shorter edge extends beyond the readable range. In S212, the scanner 100 trims the edge areas in the image data 50 into a rectangular shape with reference to the trailing edge and corrects inclination of the image of the original sheet with reference to the inclination of the trailing edge.

Figure 13:
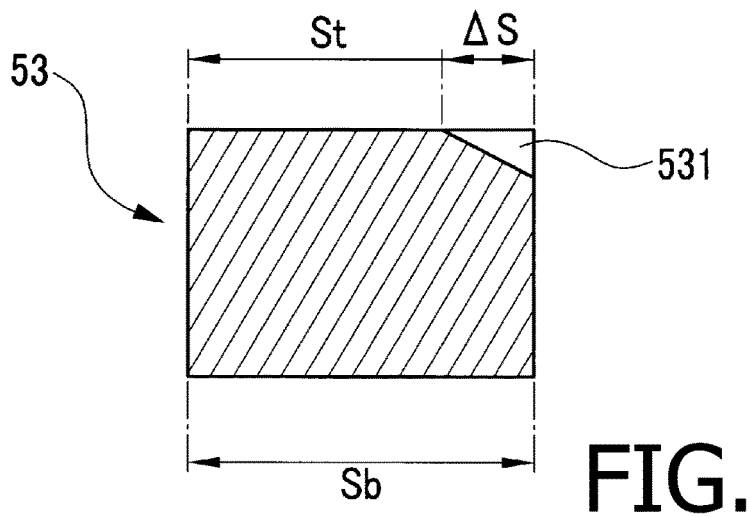
FIG. 13 illustrates image data to be corrected by the scanner according to the embodiment of the present disclosure.
Figure 14:
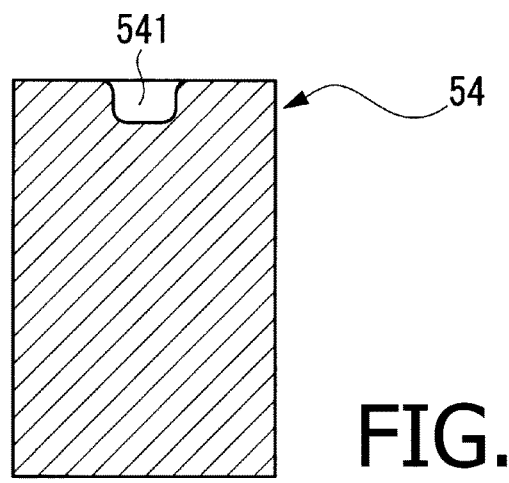
FIG. 14 illustrates image data to be corrected by the scanner according to the embodiment of the present disclosure.
Figure 15:
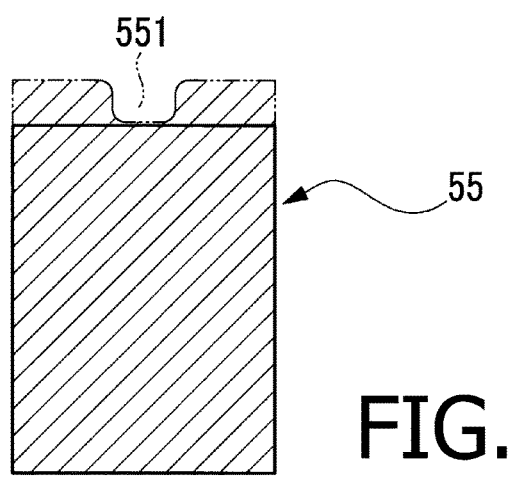
FIG. 15 illustrates image data to be corrected by the scanner according to the embodiment of the present disclosure.
Figure 16:
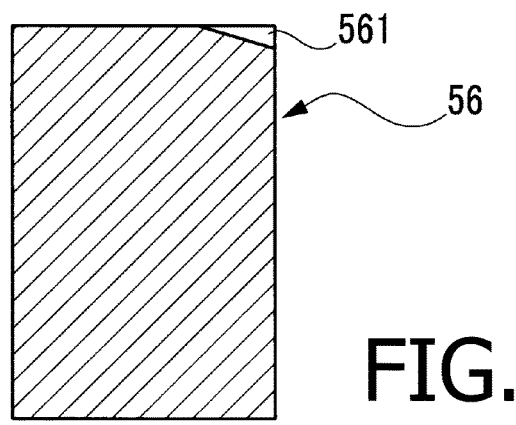
FIG. 16 illustrates image data to be corrected by the scanner according to the embodiment of the present disclosure.

After S212, the scanner 100 may obtain corrected data 53, in which skew of the image of the original sheet is corrected, as shown in FIG. 13. A hatched area in FIG. 13 represents the image of the original sheet occupying the readable area. When trimming the edge areas, for example, the scanner 100 may estimate the length of the original sheet along the conveying direction with reference to the distance between the leading edge and the trailing edge. For another example, the scanner 100 may estimate the length of the original sheet along the conveying direction with reference to the output signal from the sensor 28.

In S213, the scanner 100 determines an area corresponding to the missing corner on the leading side in the corrected data 53 to be a repairable range 531, which is to be repaired, and repairs the repairable range 531. For example, the scanner 100 may determine an area, which is defined by a difference ΔS between the lengths of the leading edge and the trailing edge, to be the repairable range 531 and may convert a color in the repairable range 531 into a color of the original sheet. The color of the original sheet may be, for example, a most frequently appearing color in the image data 50. For another example, a color of the repairable range 531 may be converted into a color, which appears in an area in the vicinity of the repairable range 531.

The example shown in FIG. 13 may apply to a case, in which a line containing the edge points E obtained in Step 2 of the edge detecting process continues to intersect with one of the ends of the leading-side image 51. In this case, the scanner 100 may determine that the repairable range 531 is in a sideward position on either one of the widthwise (leftward and rightward) sides, on which the line containing the edge points E intersects with the end of the leading-side image 51. In this example shown in FIG. 13, the repairable range 531 may be blank when the image data 50 is generated. In this regard, the repairable range 531 being blank may be filled with the color of the original sheet when the image data 50 is trimmed. For another example, if the image data 50 contains image information for the area that exceeded beyond the leading-side image 51, the scanner 100 may use the image information for the exceeded area to fill the repairable range 531.

Following S213, in S209, the scanner 100 generates the output data in the predetermined format from the corrected image data and outputs the output data. Thereafter, the scanner 100 ends the output data generating process. The scanner 100 returns to the read-and-output process (FIG. 10) and ends the read-and-output process.

Meanwhile, in S211, if the trailing edge is not longer than the leading edge (S211: NO), the scanner 100 determines the leading edge to be the edge, which is used to correct the image data 50. In S215, the trimming and inclination-correcting processes similar to S212 may be applied to the leading edge. When the trailing edge is not longer than the leading edge, it may be considered that a part of the original sheet on the trailing edge exceeded beyond the readable range. Therefore, in S215, the scanner 100 trims the edge areas in the image data 50 into a rectangular shape with reference to the leading edge and corrects inclination of the image of the original sheet with reference to the inclination of the leading edge.

In S216, repair of the missing corner similar to S213 may be applied to the leading edge. That is, the scanner 100 determines an area on the missing corner of the trailing side in the corrected data to be a repairable range and converts a color in the repairable range into the color of the original sheet.

Following S216, in S209, the scanner 100 generates the output data in the predetermined format from the corrected image data and outputs the output data. Thereafter, the scanner 100 ends the output data generating process. The scanner 100 returns to the read-and-output process (FIG. 10) and ends the read-and-output process.

Meanwhile, in S201, if detection of both the leading edge and the trailing edge has not been successful (S201: NO), in other words, if solely one of the leading edge and the trailing edge has been detected, in S218, the scanner 100 trims the edge areas in the image data 50 and corrects inclination of the image of the original sheet in the image data 50 with reference to the successfully detected edge. Thus, an image having a rectangular shape is extracted from the image data 50 based on the edge, which is recognized to be successfully detected, and the inclination thereof. Further, inclination of the extracted rectangular shape is corrected based on the edge and the inclination, and the corrected data is obtained. In this regard, the successfully detected edge may be substantially reliable to trim the image data 50 and correct the inclination.

Figure 10:
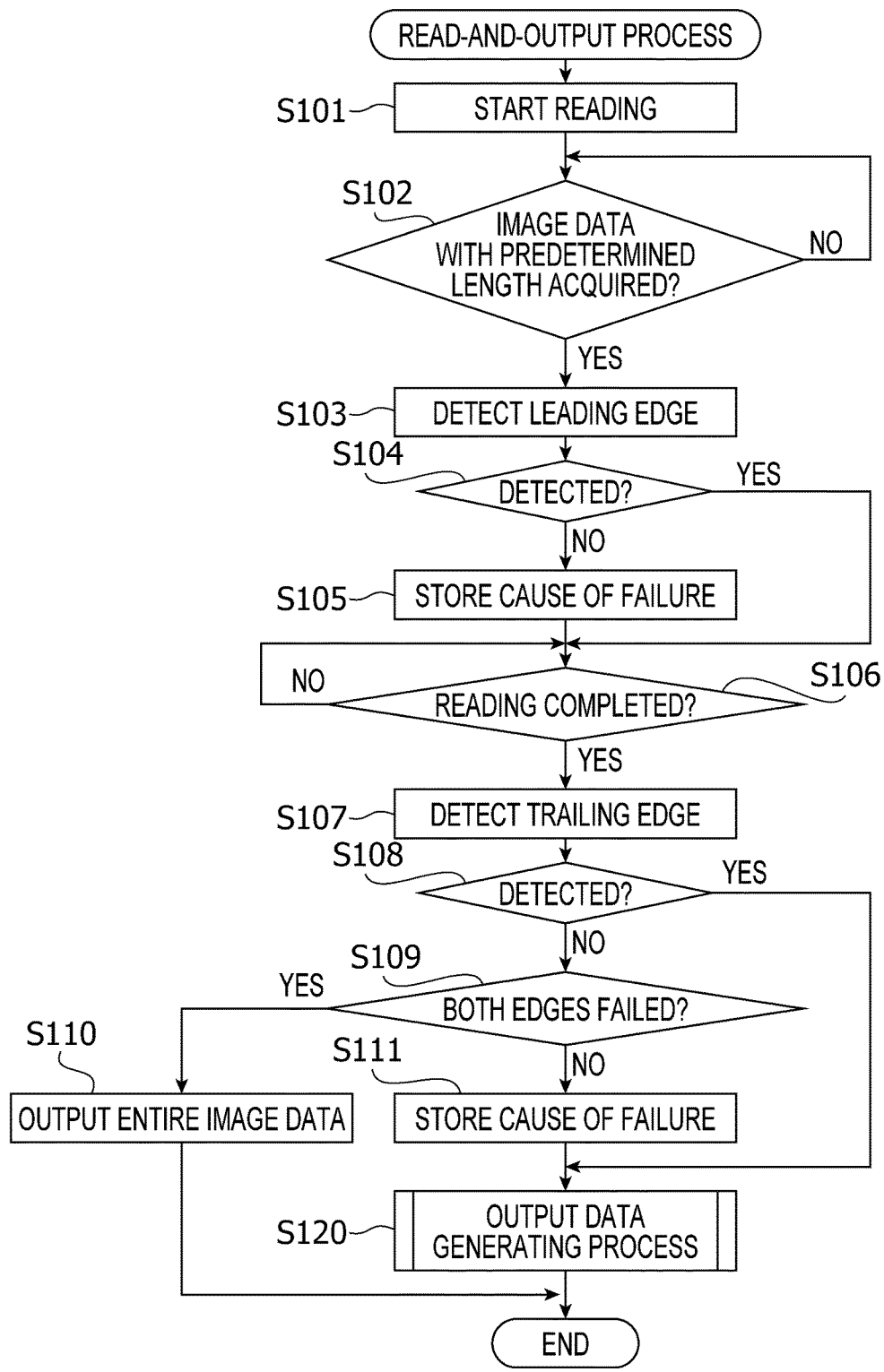
FIG. 10 is a flowchart to illustrate a flow of steps in a read-and-output process to be performed in the scanner according to the embodiment of the present disclosure.

Following S218, in S219, the scanner 100 reads the cause that induced the failure of detection of the leading edge and/or the trailing edge, which is stored in the RAM 33 or the NVRAM 34 in S105 and/or S111 (see FIG. 10). In S220, the scanner 100 determines an repairable range in the image data 50 based on the cause of the failure and amends the repairable range. For example, the scanner 100 may determine which edge, between the leading edge and the trailing edge, is to be repaired based on the cause of the failure. Thereafter, the scanner 100 may determine the repairable range with regard to the widthwise direction of the image based on the information concerning the failure, which may specify a position where the error occurred.

Figure 5:
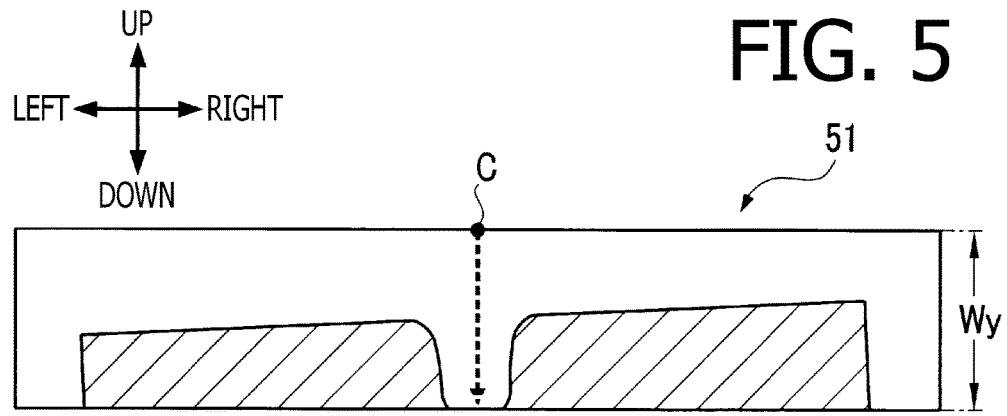
FIG. 5 is an illustrative view of the leading-side image including an image of the original sheet, of which leading edge may fail to be detected, read by the scanner according to the embodiment of the present disclosure.
Figure 6:
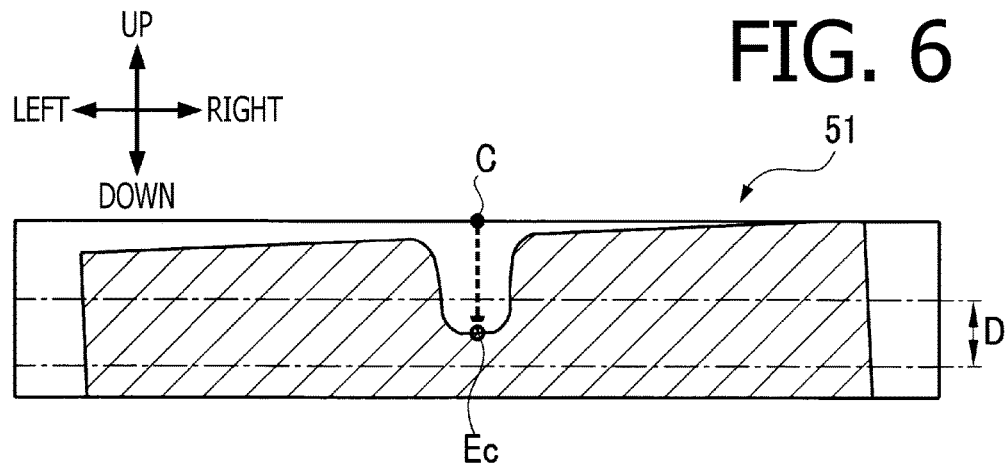
FIG. 6 is an illustrative view of the leading-side image including an image of the original sheet, of which leading edge may fail to be detected, read by the scanner according to the embodiment of the present disclosure.

For example, if the failure was due to the error in obtaining the central edge point Ec on the leading edge, as shown in the examples of FIGS. 5 and 6, the scanner 100 may obtain correction data 54 (see FIG. 14) having a missing area 541. The missing area 541 may not contain image information concerning the original sheet but may contain image information, which is similar to image information of the sheet presser 24. Therefore, the scanner 100 may determine the missing area 541 to be the repairable range and fill the missing area 541 with image information of the color of the original sheet.

In this regard, even when the failure was due to the error in obtaining the central edge point Ec on the leading edge, if the scanner 100 estimates the length of the original sheet along the conveying direction based on the output signal from the sensor 28, upon trimming, the scanner 100 may obtain correction data 55 (see FIG. 15), which does not contain the missing area 541. However, based on the determination that the leading edge failed to be detected, the scanner 100 may assume that the image data 55 may contain a missing area 551 on the leading side. Therefore, when the scanner 100 obtains correction data which does not contain a missing area, the scanner 100 may retry trimming the image data, so that new correction data should contain the missing area 551, and the missing area 551 may be filled with the color of the original sheet.

Figure 7:
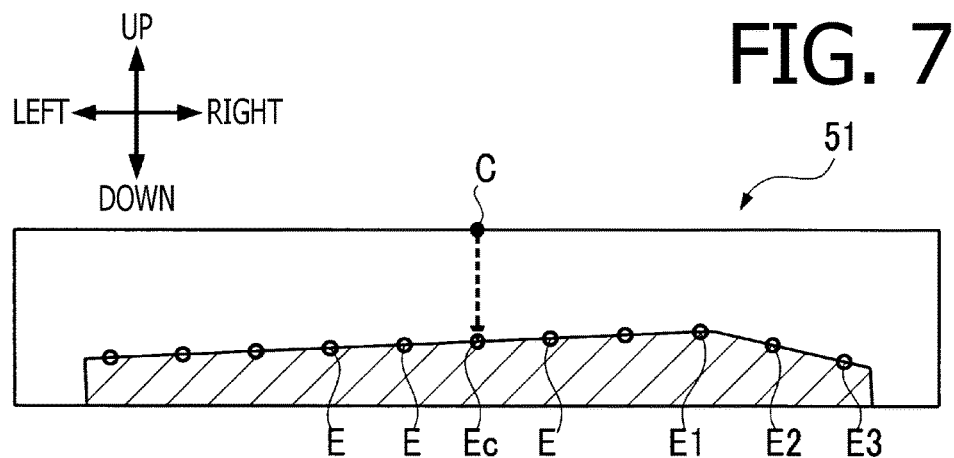
FIG. 7 is an illustrative view of the leading-side image including an image of the original sheet, of which leading edge may fail to be detected, read by the scanner according to the embodiment of the present disclosure.

For another example, if the failure was due to the lack of linearity among the edge points E, as shown in the example of FIG. 7, the scanner 100 may obtain correction data 56 (see FIG. 16), which contains a missing area 561 on a corner, or some other part, on the leading side. In this regard, if the variance among the inclination values between the adjoining edge points E is stored as the cause of the failure, based on the stored cause of the failure, the scanner 100 may determine a side, on which the missing area 561 appears, between the leftward side and the rightward side. In this regard, image information in the missing area 561 may be similar to image information of the sheet presser 24. Therefore, the scanner 100 may determine the missing area 561 to be the repairable range and fill the missing area 561 with image information of the color of the original sheet.

Following S220, in S209, the scanner 100 generates the output data in the predetermined format from the corrected image data and outputs the output data. Thereafter, the scanner 100 ends the output data generating process. The scanner 100 returns to the read-and-output process (FIG. 10) and ends the read-and-output process.

Thus, as has been described above, the scanner 100 may detect the leading edge and the trailing edge of the image of the original sheet from the image data 50 and, based on the detected conditions, the scanner 50 may determine the edge to be used to correct the image data 50. If the scanner 100 fails to detect, for example, the leading edge, the scanner 100 may still correct the image data 50 by using the trailing edge if the rail end is successfully detected. Therefore, accuracy to correct the image data 50 may be prevented from lowering but may be maintained even if a condition of the original sheet in the readable area is not desirable.

Although an example of carrying out the invention has been described, those skilled in the art will appreciate that there are numerous variations and permutations of the image reading apparatus, and the method and the program to control the image forming program that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiment may merely be regarded as examples of the claimed subject matters.

For example, the embodiment described above may not necessarily be applied to a scanner device but may be applied to various types of apparatuses that are equipped with an image reading function, such as a copier, a multi-function device, and a facsimile machine. Further, the embodiment may not necessarily be applied to an image reading apparatus that reads an image while an original sheet is being conveyed but may be applied to an image reading apparatus that holds an original sheet steady at a readable area and moves the reading head 21 with respect to the original sheet.

For another example, correction of the image data 50 may not necessarily be limited to trimming and inclination adjustment. The correction may be solely one of the trimming and the inclination adjustment or may include additional retouching processes. For another example, a repairable range may not necessarily be differed, or blank data in the repairable range may not necessarily be converted into or replaced with an altering color each time. The scanner 100 may correct the image data 50 based on the determined detected edge, and the repair of the repairable range may be omitted.

For another example, the embodiment recited a plurality of causes that may induce edge-detection failure. However, not all the recited causes may necessarily be examined. The scanner 100 may examine a single cause that may result edge-detection failure or may examine additional causes that may induce edge-detection failure.

For another example, when detection of the edge(s) fails, the cause of the failure may not necessarily be stored. Meanwhile, if the cause of the edge-detection failure is stored, the scanner 100 may detect a missing area and may repair the missing area more easily.

For another example, detection of the leading edge may not necessarily be started before reading of the entire original sheet is completed, but detection of the leading edge and detection of the trailing edge may be started after completion of reading the entire original sheet. In other words, in the read-and-output process in FIG. 9, S102 may be omitted, and S103, S104, and S105 may be performed following affirmative determination (S106: YES) in S106.

For another example, a length of the leading-side image 51, which is used to detect the leading edge, may not necessarily be limited to the predetermined length Wy starting from the upper end of the image data 50. For example, a timing, at which the original sheet being conveyed should reach the position of the reading head 21, may be determined based on the output signal from the sensor 28, and the leading-side image 51 may be obtained from an image read during a time range, which starts prior to the determined timing and ends after the determined timing.

For another example, even when the difference between the inclination of the leading edge and the inclination of the trailing edge is greater than the predetermined threshold, the entire image data 50 without correction may not necessarily be output. For example, when the difference between the inclination of the leading edge and the inclination of the trailing edge is greater than the predetermined threshold, the scanner 100 may determine that the edge detection failed, and the image data 50 may not be corrected. For another example, the scanner 100 may notify a user of the edge-detection failure and may ask the user to instruct whether the correction should be executed or omitted. For another example, an alternative correcting process may be applied.

For another example, the scanner 100 may not necessarily execute the edge detection and correct the image data 50, but an external device, such as a personal computer (PC) (not shown), which is connected with the scanner 100, may detect the edges and/or correct the image data. In this regard, for example, the PC may command the scanner 100 to read the image and transmit the image data of the read image to the PC to obtain the image data from the scanner 100. Thereafter, the PC, after receiving the image data, may detect the edges, determine success or failure of the edge detection, trim and correct the image data, and repair a missing area. For example, S101 in the read-and-output process in FIG. 10 may be replaced with a step, in which an instruction to command the scanner to start reading the image is transmitted to the scanner 100. Thereafter, the PC may obtain image data from the scanner 100. Further, S106 may be replaced with a step, in which the PC determines completion of obtaining the image data. In this regard, if the designated destination of the output data is the PC itself, the PC may not output the generated data to an external device (not shown) but may store the generated data in a storage device in the PC itself.

The processes and steps described in the above embodiment may be implemented by a single CPU, a plurality of CPUs, a hardware such as an ASIC, and/or a combination of these. The processes and steps described in the above embodiment may be implemented through a recording medium that stores a program and/or a method to perform the processes and the steps.

What is claimed is:

1. An image forming apparatus, comprising:
   a reading device configured to read an image including an image of an original sheet and generate image data based on the read image; and
   a controller configured to execute an image reading operation by executing:
   a leading edge detecting process, in which the controller attempts to detect a leading edge of the original sheet with regard to a direction to convey the original sheet from the image data acquired through the reading device;
   a trailing edge detecting process, in which the controller attempts to detect a trailing edge of the original sheet with regard to the direction to convey the original sheet from the image data acquired through the reading device;
   a determining process in which, when at least one of the leading edge and the trailing edge of the original sheet is successfully detected, the controller determines a reference edge, comprising one of the successfully detected leading edge or the successfully detected trailing edge, to be used to correct the image data acquired through the reading device based on a condition of the reference edge; and
   a correcting process, in which the controller corrects the image data acquired through the reading device by use of the reference edge,
   wherein, in the determining process, the controller determines the leading edge to be the reference edge when the leading edge is successfully detected in the leading edge detecting process and detection of the trailing edge fails in the trailing edge detecting process, and
   wherein, in the determining process, the controller determines the trailing edge to be the reference edge when detection of the leading edge fails in the leading edge detection process and the trailing edge is successfully detected in the trailing edge detecting process.

2. The image reading apparatus according to claim 1, wherein, in the determining process, the controller determines whether the leading edge and the trailing edge possess linearity, and when the controller determines that one of the leading edge and the trailing edge possess linearity and that the other of the leading edge and the trailing edge lacks linearity, the controller determines the one of the leading edge and the trailing edge that possesses linearity to be the edge, which is used to correct the image data acquired through the reading device.

3. The image reading apparatus according to claim 1, wherein, if the controller succeeds to detect one of the leading edge and the trailing edge and fails to detect the other of the leading edge and the trailing edge, the controller executes a repairing process, in which the controller repairs a part of the image on a side of the original sheet having the edge that failed to be detected.

4. The image reading apparatus according to claim 3, wherein the repairing process comprises:
   a range determining process, in which the controller determines a range to be repaired according to a cause that induced the failure of detection of the other of the leading edge and the trailing edge; and
   a converting process, in which the controller converts a color in the determined range into a color of the original sheet.

5. The image reading apparatus according to claim 1, wherein, in the determining process, the controller compares lengths of the leading edge and the trailing edge, and when the controller determines that a difference between the lengths of the leading edge and the trailing edge is greater than a predetermined value, the controller determines one of the leading edge and the trailing edge that has a greater length to be the edge, which is used to correct the image data acquired through the reading device.

6. The image reading apparatus according to claim 5, wherein, in the determining process, the controller further compares inclinations of the leading edge and the trailing edge, and when the controller determines that the difference between the lengths of the leading edge and the trailing edge is greater than the predetermined value and that a difference between the inclinations of the leading edge and the trailing edge is smaller than a predetermined threshold, the controller determines the one of the leading edge and the trailing edge that has the greater length to be the edge, which is used to correct the image data acquired through the reading device.

7. The image reading apparatus according to claim 5, wherein, if the controller succeeds to detect the leading edge and the trailing edge, the controller executes a repairing process, in which the controller repairs a part of the image on a side of the original sheet; and
   wherein the repairing process comprises:
   a range determining process, in which, when the controller determines that the difference between the lengths of the leading edge and the trailing edge is greater than the predetermined value in the determining process, the controller determines a range to be repaired on a side of the original sheet having the other of the leading edge and the trailing edge that has the shorter edge; and
   a converting process, in which the controller converts a color in the determined range into a color of the original sheet.

8. The image reading apparatus according to claim 1, wherein, in the correcting process, the controller performs trimming, in which a range containing a range of the image of the original sheet is extracted from the image data acquired through the reading device by use of the one of the leading edge and the trailing edge which is determined in the determining process.

9. The image reading apparatus according to claim 1, wherein, in the correcting process, the controller corrects inclination of the image of the original sheet in the image data acquired through the reading device by use of the one of the leading edge and the trailing edge which is determined in the determining process.

10. The image forming apparatus according to claim 1, wherein the controller generates the image data without correction when detection of both the leading edge and the trailing edge fails.

11. The image forming apparatus according to claim 1, wherein successful detection of the leading edge or the trailing edge includes obtainment of a position of a widthwise central point on the respective edge.

12. The image forming apparatus according to claim 11, wherein successful detection of the leading edge or the trailing edge includes obtainment of a position of a plurality of edge points on the respective edge.

13. The image forming apparatus of claim 12, wherein successful detection of the leading edge or the trailing edge includes determination of linearity of the plurality of edge points on the respective edge.

14. The image forming apparatus of claim 1, wherein, when both of the leading edge and the trailing edge of the original sheet are successfully detected, the controller determines the reference edge in the determining process based on at least one of:
   a determination that a difference between an inclination of the leading edge and an inclination of the trailing edge is smaller than a predetermined threshold; and
   a determination that a difference between a length of the leading edge and a length of the trailing edge is smaller than a predetermined threshold length.

15. The image forming apparatus of claim 1, wherein the condition of the reference edge comprises a predetermined brightness or RGB (red-green-blue) value.

16. A non-transitory computer readable medium storing computer readable instructions that are executable by a computer to control an image reading apparatus, the computer readable instructions, when executed by the computer, causing the computer to control the image forming apparatus by executing:
   an acquiring step to acquire image data including an image of an original sheet;
   a leading edge detecting step to attempt to detect a leading edge of the original sheet with regard to a direction to convey the original sheet from the image data acquired in the acquiring step;
   a trailing edge detecting step to attempt to detect a trailing edge of the original sheet from the image data acquired in the acquiring step;
   a determining step to determine, when at least one of the leading edge and the trailing edge is successfully detected, a reference edge, comprising one of the successfully detected leading edge or the successfully detected trailing edge, to be used to correct the image data acquired in the acquiring step based on a condition of the reference edge; and
   a correcting step to correct the image data acquired in the acquiring step by use of the reference edge,
   wherein, in the determining step, the leading edge is determined to be the reference edge when the leading edge is successfully detected in the leading edge detecting step and detection of the trailing edge fails in the trailing edge detecting step, and
   wherein, in the determining step, the trailing edge is determined to be the reference edge when detection of the leading edge fails in the leading edge detecting step and the trailing edge is successfully detected in the trailing edge detecting step.

17. The non-transitory computer readable medium storing computer readable instructions that are executable by a computer to control an image reading apparatus of claim 16, wherein the condition of the reference edge comprises a predetermined brightness or RGB (red-green-blue) value.

18. A method to be implemented on a computer to correct an image including an image of an original sheet read by an image reading apparatus, the method comprising:
   an acquiring step to acquire image data including the read image of the original sheet;
   a leading edge detecting step to attempt to detect a leading edge of the original sheet with regard to a direction to convey the original sheet from the image data acquired in the acquiring step;
   a trailing edge detecting step to attempt to detect a trailing edge of the original sheet from the image data acquired in the acquiring step;
   a determining step to determine, when at least one of the leading edge and the trailing edge is successfully detected, a reference edge, comprising one of the successfully detected leading edge or the successfully detected trailing edge, to be used to correct the image data acquired in the acquiring step based on a condition of the reference edge; and
   a correcting step to correct the image data acquired in the acquiring step by use of the reference edge,
   wherein, in the determining step, the leading edge is determined to be the reference edge when the leading edge is successfully detected in the leading edge detecting step and detection of the trailing edge fails in the trailing edge detecting step, and
   wherein, in the determining step, the trailing edge is determined to be the reference edge when detection of the leading edge fails in the leading edge detection step and the trailing edge is successfully detected in the trailing edge detecting step.

19. The method of claim 18, wherein the condition of the reference edge comprises a predetermined brightness or RGB (red-green-blue) value.

* * * * *